United States Patent [19]

Meissen et al.

[11] 3,876,920

[45] Apr. 8, 1975

[54] CIRCUIT ARRANGEMENT FOR COMBINED REGENERATIVE AND RESISTIVE BRAKING OPERATION FOR A D-C SERIES MACHINE OPERATED AS A GENERATOR

[75] Inventors: Wolfgang Meissen, Tennenlohe; Rudolf Wagner, Erlangen, both of Germany

[73] Assignee: Siemens Aktiengesellschaft, Munich, Germany

[22] Filed: Jan. 10, 1974

[21] Appl. No.: 432,423

[30] Foreign Application Priority Data
Jan. 17, 1973 Germany.............................. 2302226

[52] U.S. Cl. ................................................ 318/370
[51] Int. Cl. ................................................ H02p 3/08
[58] Field of Search ........... 318/370, 375, 376, 379, 318/380

[56] References Cited
UNITED STATES PATENTS
3,577,055  5/1971  Hermansson ................... 318/370 X
3,630,304  12/1971  Sahinkaya ........................ 318/376 X
3,657,625  4/1972  Miller et al. ......................... 318/370
3,697,845  10/1972  Soffer et al. ..................... 318/380 X

*Primary Examiner*—Robert K. Schaefer
*Assistant Examiner*—W. E. Duncanson, Jr.
*Attorney, Agent, or Firm*—Kenyon & Kenyon Reilly Carr & Chapin

[57] ABSTRACT

A circuit arrangement which provides for combined regenerative and resistive breaking operation in a D-C series machine which is operated as a generator in which a D-C control element having a main controlled rectifier and associated quenching capacitor are connected in parallel with the motor and wherein there is provided a return diode, a braking resistor and a controlled braking rectifier. In addition, an overflow diode is provided to bypass the return diode and field winding of the machine. The requirement for a separate extinguishing circuit for the breaking rectifier is avoided by providing an auxiliary rectifier which is fired at the same time as the main controlled rectifier and provides therethrough an extinguishing current from the quenching capacitor of the main controlled rectifier to extinguish the controlled braking rectifier.

8 Claims, 15 Drawing Figures

CIRCUIT ARRANGEMENT FOR COMBINED REGENERATIVE AND RESISTIVE BRAKING OPERATION FOR A D-C SERIES MACHINE OPERATED AS A GENERATOR

BACKGROUND OF THE INVENTION

This invention relates to circuits for the combined regenerative and resistive braking of D-C series machine operated as generators in general, and more paticularly to an improved arrangement for such operation which reduces a number of components required.

It is well known, that a D-C machine operating as a generator can be braked by feeding back current to a D-C source and also by the use of a resistance in parallel across the machine. Such may be done in short range vehicles such as subways and trolley cars. Typically, as described in Elektrische Bahnen, Vol. 40, 1969, No. 7, pages 148 to 155, such vehicles may have installed therein D-C control elements used for speed control. In such vehicles, it is visualized that in the future, regenerative braking will be used in order to feed the kinetic energy of the vehicle back into the D-C overhead system after its conversion into electrical energy. Such is disclosed in the publication ETZ-A, Vol. 90, 1969, No. 26, pages 700 to 703. However, the overhead line system is not always capable of absorbing all the current generated during braking and thus, additional braking must be provided to supplement the regenerative braking arrangement. Advantageously, such will be comprised of a circuit arrangement for electric resistance braking.

Such combined systems using both regenerative braking and resistance braking are known in the art. In such systems within a cycle period of the D-C control element, regenerative and resistive braking are contolled as a function of the capacity of the D-C overhead system. For example, in the last mentioned reference, a voltage control circuit is provided which first switches to regenerative braking for as long as such is possible. If the line voltage rises to a predetermined value, resistance braking is automatically switched on and takes over the braking of the vehicle, either partially or completely, depending on the ability of the overhead line to absorb the current being generated. Through such a system using mixed regenerative and resistive braking, a maxium amount of energy is returned to the D-C overhead system.

As shown in connection with FIG. 1c of this reference and also from German Offenlegungsschrift 2,057,440, a circuit arrangement is known for use in this type of operation in which a D-C control element and a braking branch, consisting of a braking resistor connected in series with a controlled braking rectifier, are connected in parallel with the D-C series machine. Furthermore, the machine is also connected to the D-C overhead system through a return diode. It is a well known fact, that armature current cannot be fed back in the required amounts at higher travel velocities, (since the e.m.f. of the machine is higher than the voltage of the overhead system) using an uncontrolled overflow rectifier. Thus, externally excited braking operation using such an overflow diode or rectifier is not possible. Braking must always be done using self excitation, i.e., the armature current and the excitation current must always be identical. For stability reasons, a resistor must also be placed in series with the D-C series machine. Thus, in this resistor and in the vehicle, dissipated heat is produced during braking as the current flows into the overhead system. Such heating represents a considerable loss of energy which could otherwise be returned to the system. In addition, the design of the braking current control for this known arrangement, prevents difficulties. When in an upper speed range with small armature currents, the braking current control must attain a high machine voltage if the D-C overhead system is to be capable of absorbing current, i.e., if the braking rectifier is not to be fired. On the other hand, in cases where the overhead system is not able to absorb the braking current in which case the braking rectifier must be fired and resistance braking used, the braking current control must provide a low machine voltage.

A similar circuit having a D-C control element with a controlled main rectifier along with a series circuit consisting of an uncontrolled return rectifier and a braking branch with the braking branch consisting of a braking resistor connected in series with a controlled braking rectifier which is connected to the D-C overhead line which can absorb the braking current at least some of the time, and wherein the series circuit consisting of the field winding of the D-C series machine and the return diode is bypassed by an uncontrolled overflow diode poled in the current flow direction of the D-C series machine operating as a generator, is described in Techn. Mitt. AEG-Telefunken 61 (1971), No. 6, pages 320 to 324, particularly on FIG. 5. This circuit avoids mmany of the difficulties associated with the above mentioned circuit. Because of the arrangement of the overflow diode, an externally exciting braking process, in which the armature current and excitation current are different magnitudes, can automatically be carried out when in higher speed ranges. The overflow diode prevents the armature voltage from rising above the value of the line voltage at the input of the circuit arrangement since it causes the field winding to be automatically bridged when this value is reached. The main drawback is this system is that the braking rectifier requires a separate extinguishing system which must be designed for the full braking current flowing through the braking branch. In the braking branch, a D-C control element is therefor used, the size of which also must be the same as that of the D-C control element in the main branch.

Thus, it can be seen that there is a need for a arrangement which provides a simplified braking branch which uses a reduced number of components and specifically for such an arrangement in which the separate extinguishing system for the contolled braking rectifier is substantially eliminated.

SUMMARY OF THE INVENTION

The present invention provides such a simplified circuit arrangement by combining the quenching capacitor and the main controlled rectifier with a simultaneously fired auxiliary controlled rectifier to form a quenching circuit for the controlled braking rectifier.

Thus, the invention is based on the concept that the quenching capacitor used with the D-C controlled element, which is arranged in the main branch, can also be used for extinguishing the braking rectifier in the braking branch. The only additional element required is an auxiliary controlled rectifier which, as with all controlled rectifiers, will preferably be a thyristor. Each time the main controlled rectifier in the D-C control element is fired, the charge of the quenching capacitor is reversed. The reversing current flows through the main controlled rectifier in a circuit including the braking rectifier to be extinguished and the auxiary controlled rectifier. Since the braking rectifier has a polarity opposite to the reversing current, it is extinguished during this process. Thereafter, the reversing current continues to flow through the conventional reversing circuit associated with the D-C control element. The extinguishing system customarily provided for such a braking branch and which includes a quenching branch, charge reversal branch and swingback branch is, thus, eliminated, thereby simplifying the design and construction of the overall system. The trigger pulses for the additional auxiliary controlled rectifier can be obtained from the source providing firing pulses to the main controlled rectifier in the D-C control element, thus avoiding the need for a separate trigger pulse unit.

One particularly advantageous embodiment includes the feature of placing the auxiliary controlled rectifier between the junction of the braking resistor and the controlled braking rectifier and one electrode of the quenching capacitor of the D-C control element. As noted above, the auxiliary rectifier is fired simultaneously with the firing of the main rectifier. The quenching capacitor initially discharges through the main rectifier, the braking rectifier and the auxiliary rectifier, thereby extinguishing the braking rectifier. Subsequently, the remaining charge of the quenching capacitor is reversed through the normal reversing circuit associated with the D-C control element. Any replenishment of the charge of the quenching capacitor is obtained from the D-C overhead system through the auxiliary rectifier is extinguished.

In order to limit the rise of voltage and current in the auxiliary rectifier, it is helpful to connect a limiting choke in series therewith. A particularly simple and economical circuit arrangement is illustrated in which at least a portion of the inductance of the reversing choke of the D-C control element is used as the limiting choke. The extinguishing circuit of the braking rectifier then consists of all or part of the reversing choke, the auxiliary rectifier, the quenching capacitor and the main controlled rectifier of the D-C control element. The remainder of the reversing choke can be arranged at a suitable point in the reversing branch. In the illustrated embodiment, a particularly advantageous arrangement is shown in which the reversing choke of the D-C control element is divided into two partial reversing chokes, with the auxiliary rectifier having one side connected between the junction of the two partial reversing chokes and its other side to the junction of the braking resistor and the braking rectifier.

BRIEF DESCRIPTION OF THE PREFERRED EMBODIMENT

Figure 1:
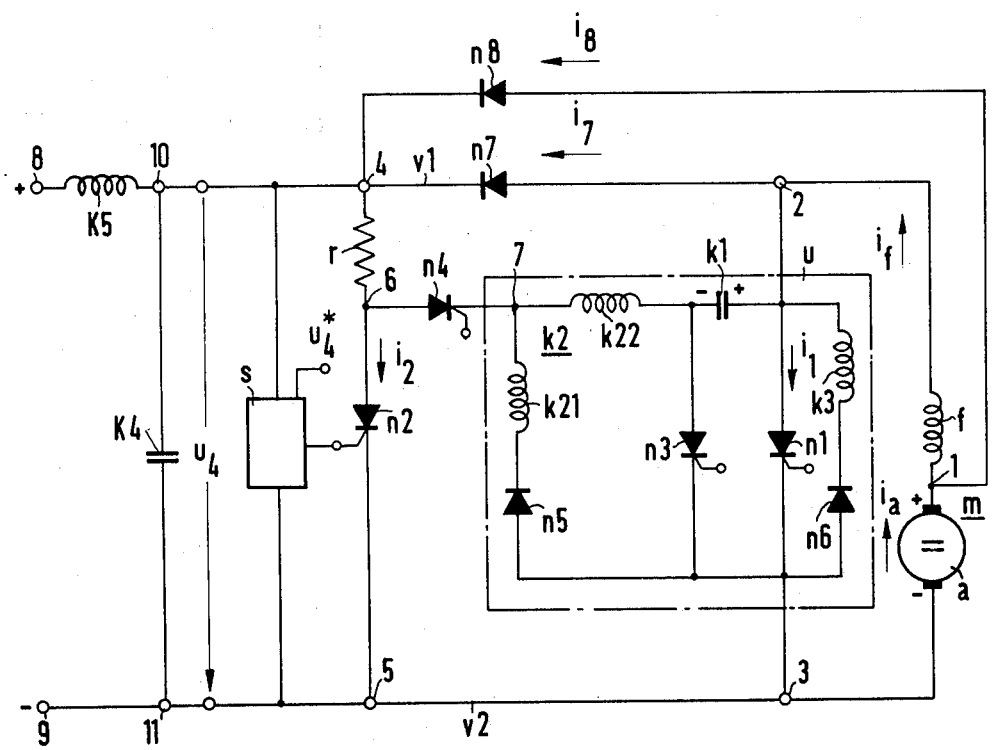
FIG. 1 is a circuit diagram illustrating a preferred embodiment of the present invention.

FIG. 1 illustrates a circuit arrangement which may be used for combined regenerative and resistive braking of a self-propelled vehicle operated from an overhead system. Although described in connection with an overhead system, the self-propelled vehicle can also be operated from a battery installed on board the vehicle with the battery providing the D-C source. It is assumed for the purposes of FIG. 1, that the operating lever of the vehicle, i.e., the drive/brake lever, which is not shown, has been brought into a brake position so that the propulsion circuit of the self-propelled vehicle is arranged in the manner illustrated on the figure. That is to say, such movement causes a plurality of contacts switching without current to establish the required arrangement for braking (or for forward motion when in a drive position), in well known fashion. The conditions of operation are, thus, one in which the vehicle is moving and, thus, has a certain amount of kinetic energy. The D-C motor designated m and which comprises an armature winding $a$ and a field winding $f$ which is coupled to the driving axle of the vehicle, will, thus, be operated as a generator. The kinetic energy is thereby converted into electrical energy.

As shown, the D-C motor is a series motor with the armature $a$ and field winding $f$ connected in series at the junction 1. Parallel therewith is a D-C control member designated $u$ and having a main controlled rectifier $n1$. As illustrated, the control element $u$ is connected between the positive and negative terminals 2 and 3 of the D-C machine $m$. In addition to the main rectifieer $n1$ in the D-C control element $u$, there is also provided a conventional extinguishing arrangement therefor. The design of the illustrated D-C control element shown in FIG. 1 is the same as that disclosed in German Auslegeschrift 1,242,289. The controlled rectifier $n1$ will preferably be a thyristor or a circuit including a plurality of thyristors in parallel, and has a polarity which is in the current flow direction of the D-C series machine when operating as a generator. Associated with the main controlled rectifier $n1$ is an extinguishing arrangement which includes the series circuit of quenching capacitor $k1$ and quenching rectifier $n3$. Quenching rectifier $n3$ will also preferably be a thyristor. In parallel to the rectifier $n3$ is a series circuit comprising an uncontrolled rectifier or diode $n5$ having a polarity opposite to that of the rectifier $n3$, and a quenching choke $k2$. In the illustrated embodiment, the quenching choke, unlike those of the prior art, includes a first partial reversing choke $k21$ and a second partial reversing choke $k22$ which can be of different sizes. In parallel with the main rectifier $n1$, there is preferably provided a series circuit comprising a swingback choke $k3$ in series with an uncontrolled swingback rectifier $n6$ having a polarity opposite that of the main rectifier $n1$.

In addition to the main branch or D-C control element $u$, there is also associated with the D-C series machine $m$, a braking branch. This comprises of a series connected braking resistor $r$ and a controlled braking rectifier $n2$. Again, a thyristor will preferably be used as the braking rectifier. The braking branch has in series therewith, an uncontrolled rectifier or diode $n7$ which couples the positive terminal 4 of the braking branch with the positive terminal 20 of the motor $m$. The other terminal 5 of the breaking branch is directly coupled to the negative terminal 3 of the D-C motor. The positive line is designated $v1$ and the negative line as $v2$. The illustrated arragement is preferable so that the controlled braking rectifier $n2$ is arranged with its cathode at the terminal 5 of the negative connecting line $v2$. This arrangement allows the negative connecting line $v2$ to be grounded. In accordance with the present invention and as shown on the drawing, a separate quenching system for the braking rectifier $n2$ is not provided. Instead, the braking rectifier $n2$ once fired is extinguished by the firing of the main rectifier $n1$ as will be described in detail below. Between the connection point 6 at which the resistor $r$ and braking rectifier $n2$ are connected and the terminal 7 at which point the two partial reversing chokes $k21$ and $k22$ are connected, an auxiliary control rectifier, preferably a thyristor, is placed. This rectifier has its cathode coupled to the junction 7. Thus, the auxiliary rectifier $n4$ has a polarity such that if it is fired and the main rectifier $n1$ is fired simultaneously, a current path is established from the positive junction point 4, through the braking resisitor $r$, the auxiliary rectifier $n4$ and the second partial reversing choke $k22$ to the electrode marked with a minus sign at the quenching capacitor $k1$. This permits the quenching capcaitor $k1$ to have any loss of charge used during quenching to be made up through this path from the overhead system or, from the battery or other D-C source on board the vehicle.

Between the junction point 1 where the field $f$ and armature $a$ are connected together and the terminal 4, an uncontrolled rectifier or diode $n8$ used as an overflow diode is connected. It has a polarity in the direction of the current flow of the armature winding when operating as a generator. At the terminal point 4, the overflow diode $n8$ is connected to both the braking branch and the positive overhead line. Because of this particular arrangement using an overflow diode $n8$, externally excited braking operation is possible in the high speed operation of the D-C series machine $m$.

In well known fashion, the positive connecting line $v1$ will be provided with a terminal 8 for the trolley (not shown) of the self-propelled vehicle. Similarly, the negative connecting line $v2$ will be equipped with a terminal 9 for contacting the negative overhead line or ground. Naturally, if an on-board battery is used rather than overhead lines, the terminals 8 and 9 will be connected to it. In addition, a smoothing choke $k5$ is placed in the positive connecting line $v1$. For the purposes of compensating for the inductance of the overhead lines, a storage capacitor $k4$ is connected across the input of the circuit arrangement between the terminals 10 and 11.

The circuit arrangement of FIG. 1 can be operated in three different ways in order to provide braking, i.e., to reduce the speed of the D-C series machine. These are as follows:

a. in a pure resistance braking operation;
b. in a purely regenerative braking operation; and
c. in mixed regenerative and resistance braking operaton.

For operation in the first mode, i.e., pure resistance braking, the machine $m$ is periodically short-circuited by the D-C control element $u$, for example, with a constant frequency and variable duty cycle. The kinetic energy of the self-propelled vehicle is converted into heat in the braking resistor $r$. Detailed operation of this manner will be explained below.

In purely regenerative braking operation, which assumes that the overhead system is always capable of absorbing all current generated or that an on-board battery which can always absorb the full current is installed, the machine $m$ is periodically short-circuited by the D-C control element $u$. Since the inductance of the armature winding $a$ and the field winding $f$ forces the armature current $i_a$ and the excitation current $i_f$ to continue when the D-C control element interrupts (by extinguishing the main rectifier $n1$), the voltage between the terminals 2 and 3 varies between 0 V and the voltage $u_4$ at the storage capacitor $k4$.

Mixed regenerative and resistance operation will be used where the overhead line or on-board battery is not capable of full current absorption all the time. In this mode of operation, the machine is similarly short-circuited periodically by the D-C control element $u$. The voltage $u_4$ supplied by the D-C series machine is additionally compared with a predetermined limit voltage $u_4^*$. The braking current of the machine is fed during the cutoff time of the main rectifier $n1$ into the overhead system or on-board battery as long as the voltage $u_4$ is lower than the limit voltage $u_4^*$. If the value of the voltage $u_4$ reaches the predetermined limit voltage $u_4^*$ while the main rectifier $n1$ is cut off, the braking rectifier $n2$ is fired so that the current is made to flow through the braking resistor $r$.

In order to make the comparison of actual voltage $u_4$ with the predetermined limit voltage $u_4^*$ and to provide firing signals for the braking rectifier $n2$ when $u_4$ is equal to or greater than $u_4^*$, a monitoring circuit designated $s$ is coupled between the terminals 10 and 11 of the connecting lines $v1$ and $v2$. Within the monitoring circuit is a conventional limit detector or comparator which compares the measured voltage $u_4$ or a function thereof developed, i.e., it may be desirable to operate at lower voltages and the voltage across the terminals 10 and 11 may be scaled down in well known fashion, with a preset limit voltage $u_4$ which is provided into the monitoring circuit by the illustrated terminal. A condition where the measured voltage $u_4$ exceeds the predetermined voltage $u_4^*$ will cause a comparator output which may then be used to generate a firing pulse for the braking rectifier $n2$ in well known fashion using a conventional pulse generating circuit.

For a better understanding of the invention, four operating conditions will now be explained with the aid of FIGS. 2 through 5.

Figure 2A:
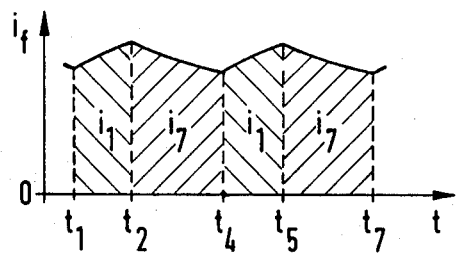
FIG. 2a is a timing diagram illustrating the relationship between field current and time in the lower speed range where the overhead line is capable of absorbing all current generated.
Figure 2B:
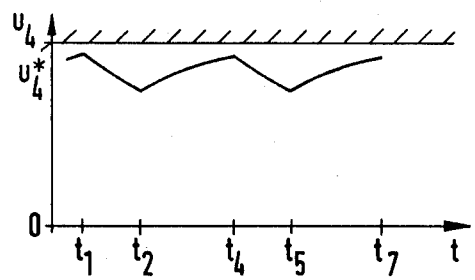
FIG. 2b is a similar diagram illustrating the voltage at the input for the same conditions.
Figure 3B:
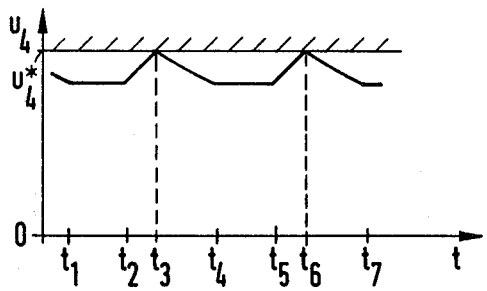
FIG. 3b is a diagram similar to FIG. 2b, showing the voltage under the conditions where all current cannot be absorbed.
Figure 2C:
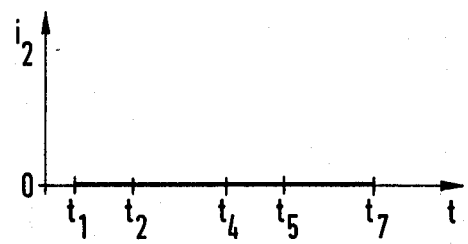
FIG. 2c is a similar diagram illustrating the current flow through the resistive branch for the same conditions.

FIGS. 2a, 2b and 2c are illustrative of the case of lower speed range operation where the overhead system is capable of fully absorbing the current generated. FIG. 2a illustrates the field current as a function of time, FIG. 2b the voltage $u_4$ as a function of time and FIG. 2c the braking current $I_2$ through the braking branch as a function of time. The main rectifier $n1$ is fired at the points in time designated $t_1, t_4, t_7, \ldots$ It is extinguished at the times $t_2, t_5, \ldots$ by the firing of the quenching rectifier $n3$. Since the system is assumed to be fully capable of absorbing all current, the braking rectifier $s2$ is not used and is thus, not fired since the voltage $u_4$ always remains below the predetermined level $u_4^*$.

First assume that the right-hand electrode of the quenching capacitor $k1$ has a positive charge at time $t_1$ as is illustrated on FIG. 1. At the time $t_1$, the main rectifier is fired. The quenching capacitor begins to discharge through the reversing rectifier $n5$ and the reversing choke $k2$. In this condition, the series circuit consisting of the armature winding $a$ and the field winding $f$ is short-circuited. In the lower speed range, the armature current $i_a$ and the excitation current $i_f$ are equal, that is, no overflow current $i_8$ flows. Braking operation is self-excited. As will be seen from FIG. 2a, the excitation current $i_f$ increases because of the short-circuit up until the time $t_2$. The current $i_1$ through the main rectifier is equal to the excitation current $i_f$ during the period between $t_1$ and $t_2$. The voltage $u4$ at the storage capacitor $k4$ drops during this period as illustrated by FIG. 2b.

At time $t_2$, the quenching rectifier $n3$ is fired. The charge reverse quenching capacitor $k1$ now discharges through the main rectifier $n1$ in a direction opposite to the flow of main current $i_1$ to extinguish the rectifier $n1$. The remaining capacitor charge continues to oscillate further through the swing back diode $n6$ and swing back choke $k3$ until the capacitor $k1$ is again charged in the manner shown in FIG. 1. As illustrated by FIG. 2a, the machine current $i_a$ equal to $i_f$ now flows, with the short circuit removed, as a return current $i_7$ through the return diode $n7$ and to the overhead line. In accordance with the assumptions made for this operation and as shown on FIG. 2b, the voltage $u_4$ at storage capacitor $k4$ which rises between times $t_2$ and $t_4$ always remains below the voltage limit $u_4^*$. That is, the overhead line can absorb the reverse current $i_7$ fully during the time period between $t_2$ and $t_4$. Thus, the braking rectifier $n2$ will not fire. As illustrated by FIG. 2c, the current $i_2$ through the braking branch remains zero at all times. Thus, all energy is returned to the overhead line and purely regenerative operation is obtained.

As illustrated, the main rectifiers are again triggered at $t_4$ and extinguished at $t_5$. This type of periodic operation continues so that the machine current always flows alternatingly either to the overhead line or through the main rectifier $n1$.

FIG. 3 also is an illustration of lower speed range operation but illustrates a case where the overhead line is not capable of fully absorbing all current. Operation is similar to that described above, with the main rectifier $n1$ being fired at the times $t_1, t_4, t_7 \ldots$ and extinguished at times $t_2, t_5, \ldots$. As will be more fully described below, with each firing of the main rectifier $n1$, the auxiliary controlled rectifier $n4$ is also fired.

Figure 3A:
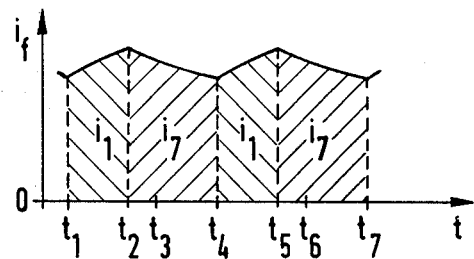
FIG. 3a is a diagram identical to that of FIG. 2a but for the condition wherein the overhead system is not capable of absorbing all current.
Figure 3C:
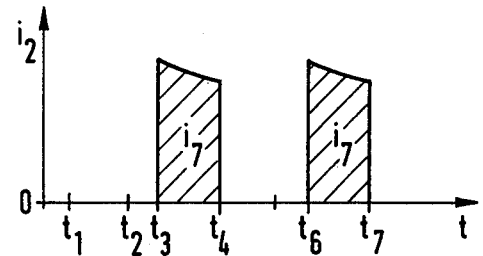
FIG. 3c is a diagram similar to FIG. 2c, illustrating the current flow in the resistive braking branch during this mode of operation.

The charge on the capacitor $k1$ in the beginning will be the same as that described above, i.e., it will be charged positively as shown on the figure. When the main rectifier $n1$ is fired at time $t_1$, the charge of the quenching capacitor $k1$ is reversed through the reversing diode $n5$ and the reversing choke $k2$. The series circuit comprising the armature winding $a$ and field winding $f$ is short-circuited through the main rectifier $n1$. Again, the armature current and excitation current are equal, indicating that the braking process is self excited. From time $t_1$ to time $t_2$, the machine current $i_a = i_f$ which is, under these conditions, also the current $i_1$, rises as indicated on FIG. 3a. The voltage $u_4$ at the storage capacitor $k4$ remains below the limit $u_4^*$ and the braking rectifier $n2$ remains cut off so that no braking current flows as illustrated by FIG. 3c.

At time $t_2$, the quenching rectifier $n3$ fires. The recharged quenching capacitor $k1$ discharges through the main rectifier $n1$ extinguishing it. The remaining charge of the quenching capacitor $k1$ oscillates back through the swing back diode $n6$ and swing back choke $k3$ until the capacitor $k1$ is again charged with the polarity shown on the figure. As illustrated by FIG. 3a, the machine current begins flowing at time $t_2$ as a return current $i_7$ through the return diode $n7$ and to the overhead wire. During this time, as shown on FIG. 3b, the voltage $u_4$ at the storage capacitor $k4$ rises until, at time $t_3$, it reaches the predetermined limit $u_4^*$. At this time and at the time $t_6$ and similar times further out on the time scale, the overhead line is no longer able to absorb the braking current without a further increase in voltage. The voltage monitoring circuit $s$ described above senses this and fires the braking rectifier $n2$ to cause a braking current to flow through the braking resistor $r$ and the braking rectifier $n2$. The current $i_2$ flowing therethrough will be equal to the return current $i_7$. During this period, the D-C series machine $m$ is now providing electrical energy to the braking resistor $r$ where it is converted into heat. This resistance braking process continues until the time $t_4$ (or $t_7$) at which point the main rectifier $n1$ is again fired.

In contrast to the prior art circuit of the above mentioned German Offenlegungsschrift 2,057,440, the braking rectifier $n2$ is not extinguished by itself after resistance braking when the main rectifier fires. This is because of the arrangement of the return diode $n7$ in the connecting line between the braking branch and main branch. When the main rectifier $n1$ fires, the voltage $u_4$ will maintain a current in the braking branch from the overhead line and, thus, the rectifier $n2$ will not be extinguished. To provide for extinguishing, other prior art circuits as described above use separate quenching circuits. However, in the circuit of the present invention, the braking branch is coupled to the quenching capacitor $k1$ of the main branch through the controlled auxiliary rectifier $n4$ as illustrated on FIG. 1.

The auxiliary rectifier $n4$ is also fired at the times $t_1, t_4, \ldots$ along with the main rectifier $n1$. When this occurs, the quenching capacitor, whose right-hand electrode is positively charged with respect to the left-hand electrode, discharges through the main rectifier $n1$, the braking rectifier $n2$ and the auxiliary rectifier $n4$, until the braking rectifier $n2$ is extinguished. The remaining capacitor charge oscillates through the main rectifier $n1$, the reversing diode $n5$ and the reversing choke $k2$ in the manner described above. If required, any loss of charge of the quenching capacitor $k1$ is replenished from the overhead line through the braking resistor $r$ and the auxiliary rectifier $n4$. This recharging always must be completed, and the auxiliary rectifier $n4$ extinguished by a reduction of its current to zero, before the main rectifier $n1$ is extinguished by the firing of the quenching rectifier $n3$ at the times $t_2, t_5, \ldots$. Otherwise, the voltage $u4$ of the overhead line at the storage capacitor $k4$ would drive a current through the braking resistor $r$, the auxiliary rectifier $n4$ and the quenching rectifier $n3$, preventing the extinguishment of the latter.

In order that the recharging current of the quenching capacitor $k1$ through the auxiliary rectifier $n4$ and the braking resistor $r$ does not approach zero slowly and asymptotically, but rather in a short, defined time, the above described division of the reversing choke $k2$ is used. The second charge reversal part of the choke $k22$ is placed in the recharging circuit of the quenching capacitor $k1$, which includes the smoothing choke $k5$, the braking resistor $r$, the auxiliary rectifier $n4$ and the main rectifier $n1$. This results in an oscillation of the recharging current which has a definite zero crossing resulting in extinguishment of the auxiliary rectifier $n4$ at which point the oscillation stops. The quenching rectifier $n3$ can be fired at any point after this zero crossing.

As is indicated, the above described process which is illustrated by FIG. 3, i.e., the cycle of operation between times $t_1$ and $t_4$ is periodically repeated. The voltage limit $u_4^*$ is periodically reached at the times $t_3, t_6, \ldots$ but only sporadically. Each time the limit is reached, the braking rectifier $n2$ fires. The braking rectifier $n2$ is extinguished each cycle, in accordance with the invention, by the firing of the main rectifier $n1$ and the auxiliary rectifier $n4$. In this mode of operation, energy is alternatively fed into the overhead line and converted to heat in the braking resistor $r$. Thus, combined regenerative and resistive braking operation is obtained.

FIGS. 4 and 5 illustrate the cases, corresponding to the cases of FIGS. 2 and 3 for operation at higher speeds. That is, FIG. 4 illustrates operation where all energy is returned to the overhead line, i.e., purely regenerative operation, and FIG. 5 the case where mixed regenerative and resistive braking operation is obtained. Operation is essentially the same as that described above with one major exception. In higher speed operation, if the e.m.f. at the armature winding $a$ becomes larger than the voltage $u_4$ at the overhead line, the overflow diode $n8$ carries an overflow current $i_8$ causing the braking operation to take place with external excitation.

Figure 4A:
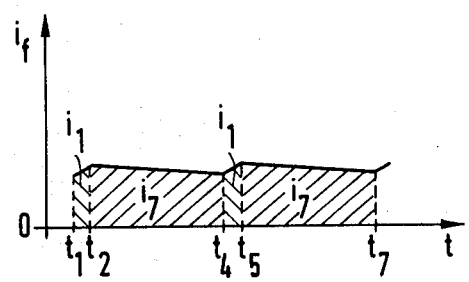
FIGS. 4a, 4b, 4c and 4d are similar diagrams illustrating respectively the field current, overflow current, input votlage, and resistive braking branch current for high speed operation where the system is capable of absorbing all current.
Figure 4B:
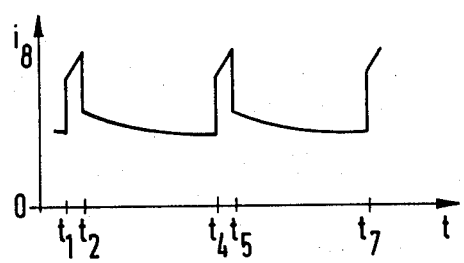
Figure 4C:
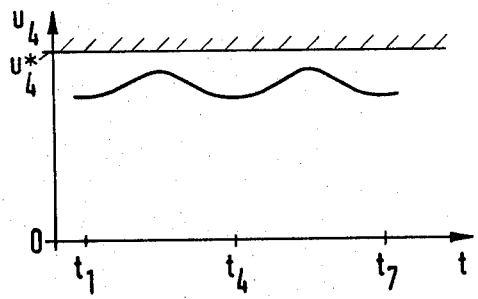
Figure 5C:
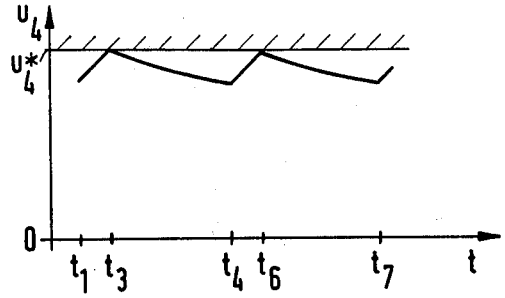
Figure 4D:
Figure 5D:
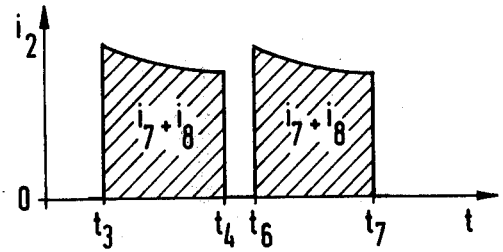

In FIG. 4, the assumption is again made that the overhead line is capable of fully absorbing the braking current as illustrated by FIG. 4d, which shows the current in the resistive branch $i_2$ remaining at zero through all phases of operation. FIG. 4c illustrates that the voltage $u_4$ never reaches or exceeds the predetermined voltage level $u_4^*$. Thus, as in the operation described in connection with FIG. 2, all energy is returned to the overhead line and the braking rectifier $n2$ is not fired. As before, the main rectifier $n1$ is fired at the times $t_1, t_4, t_7, \ldots$ and extinguished at times $t_2, t_5, \ldots$ by firing of the quenching rectifier $n3$. Since the braking rectifier is not used in this mode of operation, in principal it is not necessary to fire the auxiliary rectifier $n4$. However, in the interst of design simplicity of the firing circuit which will be of a conventional nature and is not shown, the rectifier $n4$ will normally always be fired along with the main rectifier $n1$. In the time intervals $t_1$ to $t_2, t_4$ to $t_5, \ldots$ an increasing portion of the armature current $i_a$ flows as an excitation current $i_f$ through the field winding and as the main current through the main rectifier $n1$. During this period, the e.m.f. tends to become larger than the voltage $u_4$ as shown on FIG. 4a and 4b. However, another portion of the armature current $i_a$ flows as an overflow current through the overflow diode $n8$ to the overhead system. During this period, the return current $i_7$ is zero. That is to say, under these conditions, the armature current $i_a$ and the excitation current $i_f$ are different. After the main rectifier $n1$ is extinguished at the times $t_2, t_5, \ldots$ a decreasing overflow current $i_8$ is fed into the overhead system in addition to the excitation current $i_f$ flowing through the return diode $n7$, which also decreases with time. The armature current $i_a$ and the excitation current $i_f$ are thus, also different between the points in time $t_2$ and $t_4$, $t_5$ and $t_7, \ldots$. A portion of the armature current $i_a$ is fed back into the overhead system through the overflow diode $n8$ and the remainder through the diode $n7$. Since the capacitor voltage $u_4$ does not exceed the limit $u_4^*$, the braking rectifier $n2$ is not fired and all braking energy is fed back to the overhead line system, resulting in purely regenerative braking. The excitation current $i_f$ and thereby, the armature current $i_a$ can be adjusted by the duty cycle, i.e., the current carrying time of rectifier $n1$ to the total cycle between $t_1$ and $t_4$. From the product of both currents, the desired braking torque of the machine $m$ is obtained.

FIG. 5 illustrates operation where it is assumed that the overhead line is not capable of fully absorbing the braking current when operating in the upper speed range. As is in the operation described in connection with FIG. 3, mixed regenerative and resistive braking operation is obtained. In the manner described above, at the points in time $t_1, t_4, t_7, \ldots$ both the main rectifier $n1$ and the auxiliary rectifier $n4$ are simultaneously fired. The quenching rectifier $n3$ is fired at the times $t_2, t_5, \ldots$ for the purpose of extinguishing the main rectifier $n1$. As above, the firing of the braking rectifier $n2$ takes place in response to an output from the voltage monitoring circuit $s$ at the times $t_3, t_6, \ldots$ when the voltage $u_4$ has reached the voltage limit $u_4^*$, as shown on FIG. 5c.

Figure 5A:
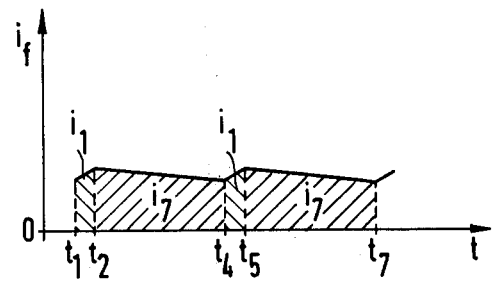
FIGS. 5a, 5b, 5c and 5d are diagrams similar to those of FIG. 4, illustrating the same quantities for high speed operation where the overhead system is not capable of fully absorbing the current.
Figure 5B:
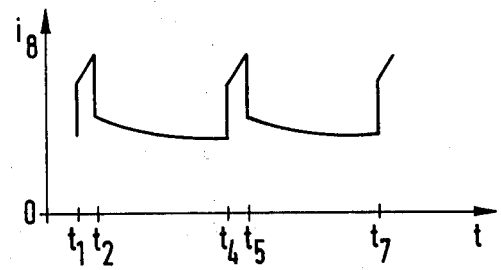

The waveform of the excitation current $i_f$ shown on FIG. 5a, corresponds to the presentation of FIG. 4a and the waveform of the overflow current $i_8$ of FIG. 5b is essentially the same as that shown in FIG. 4b. Operation is thus, essentially the same as described above in connection with FIG. 4.

Thus, in this case also, externally exciting braking operation is obtained with feedback to the overhead system taking place between the points in time $t_1$ and $t_3$, $t_4$ and $t_6, \ldots$. Beginning at the times $t_3, t_6 \ldots$ a branch current $i_2$ will flow through the braking resistor $r$ with the braking rectifier $n2$ fired. The branch current $i_2$ which is made up of the two currents $i_7$ and $i_8$ decreases with time as shown on FIG. 5d. Thus, during the periods between $t_3$ and $t_4$, $t_6$ and $t_7, \ldots$ resistance braking takes place since the overhead system is not capable of absorbing all the current. Thus, in the operation illustrated by FIG. 5, mixed regenerative and resistance braking operation for external excitation of the D-C series machine $m$ is shown.

In practice, the extreme cases shown in FIGS. 2 and 4 where the overhead system is always capable of absorbing current will rarely happen. Normally, the overhead system will be capable of absorbing only a portion of the braking current produced by the D-C series machine $m$. Thus, normally the waveforms developed will correspond to those shown on FIGS. 3 and 5. Typically, the voltage limit $u_4^*$ will be reached at a later point of time than that illustrated on the figures, causing the controlled braking rectifier $n2$ to be fired at a later point in time. Thus, normally more power will be returned to the overhead system than is indicated by the illustrations on the figures.

Thus, an improved circuit arrangement for obtaining combined regenerative and resistive braking in a series D-C machine operating as a generator and which substantially reduces the number of circuit elements required has been shown. Although a specific embodiment has been illustrated and described, it will be obvious to those skilled in the art that various modifications may be made without departing from the spirit of the invention when is intended to be limited solely by the appended claims.

What is claimed is:

1. A circuit arrangement for the mixed regenerative and resistance braking operation of a D-C series machine which includes an armature and a field winding in series operated as a generator comprising:
   a. a D-C control element including a controlled main rectifier and a quenching circuit with a quenching capacitor therein, said element in parallel with said series machine;
   b. an uncontrolled return rectifier coupling the series machine to a D-C source which can absorb the current generated at least some of the time;
   c. a braking branch including at least a braking resistor in series with a controlled braking rectifier coupled in parallel with said series machine through said uncontrolled return rectifier;
   d. an uncontrolled overflow rectifier having a polarity in the current flow direction of the D-C series machine operating as a generator, coupling the junction of the armature and field winding to the overhead system; and wherein the improvement comprises:
   e. a controlled auxiliary rectifier coupling the quenching capacitor and main rectifier of the D-C control element to said controlled braking rectifier, to form a quenching circuit therefor.

2. The invention according to claim 1 wherein said auxiliary rectifier is placed between the junction of said braking resistor and said braking rectifier and one electrode of the quenching capacitor of the D-C control element.

3. The invention according to claim 1 wherein said auxiliary rectifier has in series therewith a limiting choke.

4. The invention according to claim 2 wherein said auxiliary rectifier has in series therewith a limiting choke.

5. The invention according to claim 3 wherein said D-C control element includes a reversing choke in its quenching circuit and wherein at least a portion of said reversing choke is used as said limiting choke.

6. The invention according to claim 4 wherein said D-C control element includes a reversing choke in its quenching circuit wherein at least a portion of said reversing choke is used as said limiting choke.

7. The invention according to claim 5 wherein said reversing choke of said D-C control element is divided into two partial reversing chokes and said auxiliary rectifier is coupled between the junction of said braking resistor and said braking rectifier and the junction of said two partial reversing chokes.

8. The invention according to claim 6 wherein said reversing choke of said D-C control element is divided into two partial reversing chokes and said auxiliary rectifier is coupled between the junction of said braking resistor and said braking rectifier and the junction of said two partial reversing chokes.

* * * * *

UNITED STATES PATENT OFFICE
CERTIFICATE OF CORRECTION

Patent No. 3,876,920          Dated April 8, 1975

Inventor(s) Wolfgang Meissen et al.

It is certified that error appears in the above-identified patent and that said Letters Patent are hereby corrected as shown below:

In column 1, line 9, change "paticularly" to --particularly--

In column 3, line 4, change "auxiary" to --auxiliary-- line 34, change "is obtained from the D-C overhead system through the auxiliary rectifier is extinguished." to
--is obtained from the D-C source or the D-C overhead system through the auxiliary rectifier and the braking resistor, after which the auxiliary rectifier is extinguished.--

In column 4, line 12, change "votlage" to --voltage--

In column 4, line 51, change "rectifieer" to --rectifier--

In column 5, line 2, change "priror" to --prior--
line 18, change "terminal 20" to --terminal 2--
line 22, change "arragement" to --arrangement--
line 40, change "juncition" to --junction--
line 44, change "capcaitor" to --capacitor--
In column 6, line 12, change "operaton" to --operation--

Signed and sealed this 1st day of July 1975.

(SEAL)
Attest:

RUTH C. MASON
Attesting Officer

C. MARSHALL DANN
Commissioner of Patents
and Trademarks